United States Patent Office 3,308,618
Patented Mar. 14, 1967

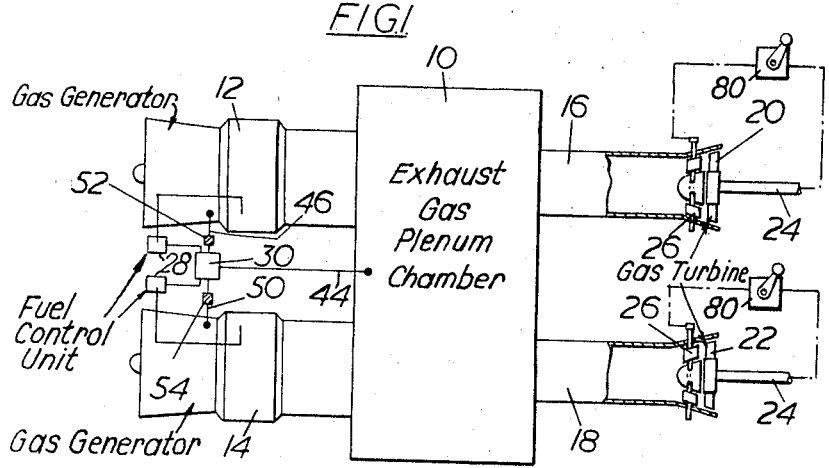
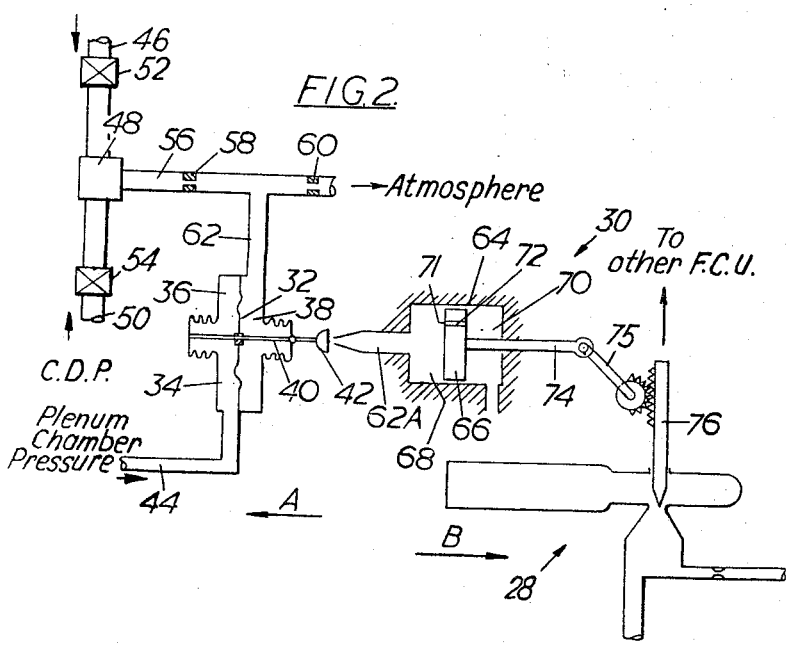

3,308,618
RANGE BLOWER PRESSURE CONTROL
Albert Jubb, Derby, and Keith Anthony Hatchett, Alvaston, Derby, England, assignors to Rolls-Royce Limited, Derby, England
Filed Dec. 4, 1964, Ser. No. 416,058
Claims priority, application Great Britain, Dec. 9, 1963, 48,605/63
7 Claims. (Cl. 60—39.15)

This invention relates to a control system for use with power producing plant of the kind having one or more gas turbine engines arranged so as to discharge their gas efflux into a common manifold or plenum chamber, the chamber being provided with one or more variable outlet nozzles through which gas can be selectively discharged so as to drive a turbine or turbines.

Throughout the specification the term gas turbine engine is to be understood as an engine having a compressor, combustion equipment and a turbine drivingly connected to the compressor.

According to the present invention there is provided apparatus for substantially maintaining a selected value of the ratio between the plenum chamber pressure and the engine compressor delivery pressure in a power producing plant of the kind referred to, comprising a device which can be subjected to said pressures or to signals functionally related thereto and responsive to a change in the value of said ratio from the selected value to actuate means for varying the flow of fuel to the engine or engines whereby to restore the selected value.

The pressure responsive device preferably comprises a diaphragm mounted within a chamber, one side of the diaphragm being connected so as to be subjected to the pressure within the plenum chamber, and the other being connected as to be subjected to the delivery pressure of the engine compressor, or to pressures functionally related thereto.

The pressure responsive member is preferably adapted to actuate valve means for controlling the supply of fuel to the engine or engines.

Preferably the valve means are adapted to control displacement of a piston within a cylinder, the piston being connected to means controlling the supply of fuel to the engine or engines.

In order that the invention can be clearly understood and readily carried into effect a control device in accordance with the invention will now be particularly described with reference to the accompanying drawings in which, FIGURE 1 shows diagrammatically power producing plant of the kind having two gas turbines arranged to discharge their efflux into a plenum chamber, which power producing plant includes a control device in accordance with the invention, and FIGURE 2 is a view showing the control device in greater detail.

Referring to the drawings, 10 indicates a plenum chamber into which two gas turbine engines 12 and 14 are arranged to discharge their exhaust gases. The plenum chamber is also provided with two outlets 16 and 18, in each of which is disposed a turbine 20, 22 respectively drivingly connected to an output shaft 24.

Each outlet 16, 18 is provided with an annular array of guide vanes 26 all of which can be simultaneously pivoted about their radial axis to vary the area of the outlet. Pivotal movements of the guide vanes can be effected by means responsive to the rotational speed of turbines 20, 22.

Means are provided for controlling the two gas turbine engines 12 and 14, the said means comprising a fuel flow control unit 28, one for each engine and a device 30 adapted to actuate the unit 28 so as to vary the flow of fuel to the engine.

The device 30, as shown in FIG. 2 of the drawings, comprises a diaphragm 32 supported within a housing 34 so as to provide two separate chambers 36 and 38. A spindle or rod 40 carried by the diaphragm is supported at each end in a bellows so as to be axially slideable and supports a half ball valve 42 on one end thereof.

A conduit 44 is connected at one end to the plenum chamber 10 and at the other to the chamber 36 whereby one side of the diaphragm 32 is subjected to the pressure within the plenum chamber 10. A further conduit 46 is connected at one end so as to communicate with the outlet from the compressor of the engine 12 and to transmit the compressor outlet pressure to a manifold 48.

A still further conduit 50 is connected between the outlet of the compressor of the engine 14 and the manifold 48. Each of the conduits 48 and 50 incorporates a non-return valve 52 and 54 respectively whereby the pressure within the manifold 48 is the higher of the two engine compressor delivery pressures.

It will be appreciated that it is extremely unlikely that both of the engines will have the same compressor delivery pressure because of for example slight differences in engine conditions. Therefore it is essential to provide the non return valves 52 and 54 to prevent flow of compressor air from the manifold to the engine which has the lower compressor delivery pressure.

An outlet conduit 56 is provided on the manifold which communicates with atmosphere at its downstream end. Two spaced apart restrictions 58 and 60, arranged in flow series are provided in the conduit 56 and a tapping of air from between the restrictions is led to the chamber 38 through a conduit 62, whereby the diaphragm is subjected to a pressure which is functionally related to the higher of the two compressor delivery pressures.

As can be seen from FIG. 2 of the drawings the half ball valve 42 is disposed over the open end of a conduit 62A carried on one end of a cylinder 64 which houses a piston 66.

The piston 66 divides the cylinder 64 into two chambers 68 and 70. An incompressible fluid, supplied from a pump is fed into the chamber 70 whilst a conduit 71 incorporating a restriction 72 is connected between the chambers 68 and 70. It will thus be seen that the chamber 68 will be subjected to a pressure which can be equal to or less than the pressure within the chamber 70. The piston 66 is provided with a piston rod 74 which projects outside the cylinder 64 which is pivotally connected to a connecting member 75. The connecting member 75 is, in turn, constrained into toothed engagement with a valve 76 which is adapted to control the fuel flow to an engine, and forms part of the fuel control unit 28. Movement of the valve 76 is transmitted, by means not shown, to cause corresponding movement of a valve in the fuel control unit 28 of the other engine, as shown in FIGURE 1.

The area of the face of the piston 66 on the right in FIGURE 2 is smaller than the area of the face to the left because of the attachment of the piston rod 74 to the right hand face of piston 66.

When the above described device is in use the exhaust gases from the two engines 12 and 14 enter the plenum chamber 10 and then pass into the two outlets 16 and 18 to drive the turbines 20 and 22.

If it is desired to increase the power output of the turbine 20, then the area of the outlet 16 is increased by appropriate movements of the vanes 26 whereby the flow of gas through the turbine is increased.

However this increase in flow results in a drop in pressure within the plenum chamber 10 since in effect the total outlet area therefrom has been increased. Thus the pressure supplied to the chamber 36 will decrease causing the diaphragm 32, which has previously attained a balanced position, to move in the direction of arrow A whereby the half ball valve 42 is moved away from the end of the conduit 62 and thus permit some of the fluid in the chamber 68 to be bled off. This reduces the pressure within the chamber 68 whereby the piston 66 will also move in the direction of arrow A. Since the connecting member 75 is inextensible, pivotally connected to the piston rod 74 and constrained into toothed engagement with the valve 76, the motion of the piston rod 74 will cause the right hand end of the connecting member 75 to move upwards (as viewed in the drawing), thus causing the valve 76 to increase the flow of fuel to the engines.

An increase in the fuel flow will increase the mass flow through the engine thus increasing the pressure within the plenum chamber so that the pressure within the chamber 36 increases to reduce the movement of the diaphragm until such time as the pressure ratio thereacross prevents further movement of the half ball valve.

It will be appreciated that since the mass flow through the engines has been increased the pressure within the plenum chamber will be increased beyond the pressure therein prior to an increase in the fuel flow.

This means that simultaneously with the increase in pressure in the plenum chamber 10 the pressure drop across the turbine 22 will increase with consequent overspeeding thereof. However governor means 80 are provided to actuate the guide vanes 26 in the outlet connected to the turbine 22 to reduce the outlet area.

Valve means not shown are provided in the plenum chamber 10 to enable the pressure therein to be reduced when the fuel flow to the engines is increased. If the area of the outlet 16 is decreased to decrease the power output of the turbine 20 the flow of gas through the turbine is decreased.

This decrease in flow results in a pressure increase within the plenum chamber 10 whereby the pressure within the chamber 36 will increase. The half ball valve 42 will thus move to reduce the flow of fluid from the chamber 68 whereby when the pressures on each side of the piston are about equal such that the pressure forces acting on the face of the piston 66 defining one wall of the chamber 68 are greater than the forces acting on the other face of the piston 66 due to the difference in area of these faces, the piston will move in the direction of arrow B so as to reduce the fuel flow to the engine.

However even though the fuel flow is reduced the pressure in the plenum chamber will not be immediately reduced and thus the valve means, not shown, are provided to permit the escape of gas from the plenum chamber. It will be appreciated that since the pressure falls the turbine 20 will slow down and thus the governor means 80 of the turbine simultaneously increase the area of the outlet to increase the speed of the turbine to that which was previously selected.

What is claimed is:

1. In a power producing plant which includes at least two gas turbine engines each of the type having compressor means, combustion equipment, turbine means connected to drive the compressor means and means for varying the flow of fuel to the combustion equipment, and each arranged to discharge its gas efflux into a common plenum chamber, said chamber having at least one variable outlet nozzle, at least one power turbine connected to be driven by gas discharging through said variable outlet nozzle, control apparatus comprising:

means for sensing a derived pressure which is functionally related to the delivery pressure having the highest value among the delivery pressures of all the compressor means, a pressure responsive device subjected to said derived pressure in one direction and to the pressure in the plenum chamber in an opposite direction, said device being responsive to the ratio of said plenum chamber pressure and said derived pressure, and actuating means, operated by said device, to actuate the means for varying the flow of fuel to the combustion equipment in each engine, whereby said ratio is substantially maintained at a preselected value.

2. Control apparatus as claimed in claim 1 and in which said actuating means comprises a cylinder, a piston movable within the cylinder, and valve means operated by the displacement of said pressure responsive device, to control the movement of the piston within the cylinder, said piston being connected to the means for varying the flow of fuel to the combusion equipment in each engine.

3. Control apparatus as claimed in claim 2 and including a source of hydraulic fluid connected to the interior of the cylinder on one side of the piston, a conduit connecting the interior of the cylinder on one side of the piston to the interior of the cylinder on the other side of the piston and a restrictor mounted in said conduit, and wherein said valve means regulates the escape of hydraulic fluid from the interior of the cylinder on said other side of the piston.

4. Control apparatus as claimed in claim 3 and in which said conduit is formed between the opposite faces of the piston.

5. Control apparatus as claimed in claim 3 and in which the area of the face of the piston on said one side is smaller than on said other side.

6. Control apparatus as claimed in claim 1 and including means responsive to the speed of the power turbine for regulating the flow of gas from the plenum chamber to the power turbine.

7. Control apparatus as claimed in claim 1 and in which the means for deriving the pressure functionally related to the highest compressor delivery pressure comprises a common duct, a plurality of conduits each connected at one end to a respective compressor delivery point and at the other end to the common duct, and a plurality of one-way valves, with each conduit having one one-way valve mounted therein.

References Cited by the Examiner

UNITED STATES PATENTS

| | | | |
|---|---|---|---|
| 2,668,415 | 2/1954 | Lawrence | 60—39.28 |
| 2,960,821 | 11/1960 | Scherl | 60—39.15 X |
| 3,068,647 | 12/1962 | Santamaria et al. | 60—39.16 X |
| 3,159,000 | 12/1964 | McCombs | 60—39.16 X |
| 3,257,807 | 6/1966 | Hornschuch et al. | 60—39.24 |

JULIUS E. WEST, *Primary Examiner.*